US011023661B2

(12) United States Patent
Sun et al.

(10) Patent No.: US 11,023,661 B2
(45) Date of Patent: Jun. 1, 2021

(54) VISUALLY ENHANCED DIGITAL INK

(71) Applicant: Microsoft Technology Licensing, LLC, Redmond, WA (US)

(72) Inventors: Yibo Sun, Bellevue, WA (US); Sheng Yi, Bellevue, WA (US); Xiao Tu, Medina, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/970,186

(22) Filed: May 3, 2018

(65) Prior Publication Data

US 2019/0340227 A1 Nov. 7, 2019

(51) Int. Cl.
*G06F 17/00* (2019.01)
*G06F 40/166* (2020.01)
*G06F 3/0484* (2013.01)
*G06F 3/0488* (2013.01)
*G06F 40/30* (2020.01)
(Continued)

(52) U.S. Cl.
CPC ........ *G06F 40/166* (2020.01); *G06F 3/04847* (2013.01); *G06F 3/04883* (2013.01); *G06F 40/109* (2020.01); *G06F 40/205* (2020.01); *G06F 40/30* (2020.01)

(58) Field of Classification Search
CPC .. G06F 17/242; G06F 17/211; G06F 17/2785; G06F 40/166; G06F 40/30; G06F 40/109; G06F 40/205; G06F 3/04847; G06F 3/04883; G06F 40/171
See application file for complete search history.

(56) References Cited

U.S. PATENT DOCUMENTS

| 5,596,350 A | * | 1/1997 | Capps | G06F 40/103 |
| | | | | 345/173 |
| 2005/0108640 A1 | * | 5/2005 | Thacker | G06F 3/0481 |
| | | | | 715/268 |

(Continued)

FOREIGN PATENT DOCUMENTS

| EP | 1174801 A2 | 1/2002 |
| EP | 1486883 A2 | 12/2004 |

OTHER PUBLICATIONS

"International Search Report and Written Opinion Issued in PCT Application No. PCT/US19/20990", dated Jun. 3, 2019, 12 Pages.

*Primary Examiner* — Andrew T McIntosh
(74) *Attorney, Agent, or Firm* — Rainier Patents, P.S.

(57) ABSTRACT

Described herein is a system and method for visually enhancing digital ink of an electronic document. A trigger to visually enhance digital ink of portion(s) of the electronic document is received. In response to the received trigger, the digital ink of portion(s) of the electronic document to determine a semantic structure of the digital ink in response to the received trigger. The digital ink of the portion(s) of the electronic document are visually enhanced in accordance with the determined semantic structure. Visual enhancement can include horizontal line adjustment, aligning line(s), aligning word in a particular line using a baseline, adjusting vertical spacing of lines, paragraphs, and/or lists, adjusting spacing between words and/or list items in a particular line, modifying ink styling (e.g., ink size, ink thickness, ink color), adjusting sizing of characters in a same group, unifying ink color, and/or unifying ink thickness.

20 Claims, 16 Drawing Sheets

(51) Int. Cl.
    *G06F 40/109*     (2020.01)
    *G06F 40/205*     (2020.01)

(56) References Cited

U.S. PATENT DOCUMENTS

| | | |
|---|---|---|
| 2007/0076952 A1 | 4/2007 | Raghupathy et al. |
| 2007/0089051 A1* | 4/2007 | Madan .................. G06F 17/241 715/234 |
| 2012/0096345 A1 | 4/2012 | Ho et al. |
| 2012/0201459 A1* | 8/2012 | Lin ....................... G06F 40/171 382/179 |
| 2012/0218305 A1* | 8/2012 | Patterson ........... G06Q 30/0621 345/652 |
| 2013/0343639 A1* | 12/2013 | Benko .................... G06T 11/60 382/155 |
| 2014/0108675 A1* | 4/2014 | Wu ....................... G06F 17/227 709/246 |
| 2014/0344662 A1* | 11/2014 | Isabel .................... G06F 17/241 715/230 |
| 2016/0147723 A1* | 5/2016 | Lee ....................... G06F 17/242 715/268 |
| 2016/0179772 A1* | 6/2016 | Perrin .................. G06F 3/04883 715/268 |
| 2016/0210037 A1* | 7/2016 | Zhang ................. G06F 3/04883 |
| 2016/0253300 A1 | 9/2016 | Tu et al. |
| 2016/0379385 A1 | 12/2016 | Tu et al. |
| 2017/0161866 A1* | 6/2017 | Baudry ............... G06F 3/04883 |
| 2017/0242579 A1 | 8/2017 | Poon et al. |
| 2017/0277674 A1 | 9/2017 | Zhou et al. |
| 2017/0285931 A1 | 10/2017 | Duhon et al. |

* cited by examiner

VISUALLY ENHANCED DIGITAL INK

BACKGROUND

With increasing frequency, computer users can add digital ink (electronic ink) to electronic documents. For example, a stylus or electronic pen can be used to write on an electronic input screen to add digital ink to a document. Many times, users create electronic notes with digital ink in a hurried manner and/or disorganized manner.

SUMMARY

Described herein is a system for visually enhancing digital ink of an electronic document, comprising: a processing system comprising a processor and a memory having computer-executable instructions stored thereupon which, when executed by the processor, cause the computer to: receive a trigger to visually enhance digital ink of at least a portion of the electronic document; analyze the digital ink of the at least the portion of the electronic document to determine a semantic structure of the digital ink in response to the received trigger; visually enhance the digital ink of the portion of the at least the portion of the electronic document in accordance with the determined semantic structure; and provide the visually enhanced digital ink of the at least the portion of the electronic document.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
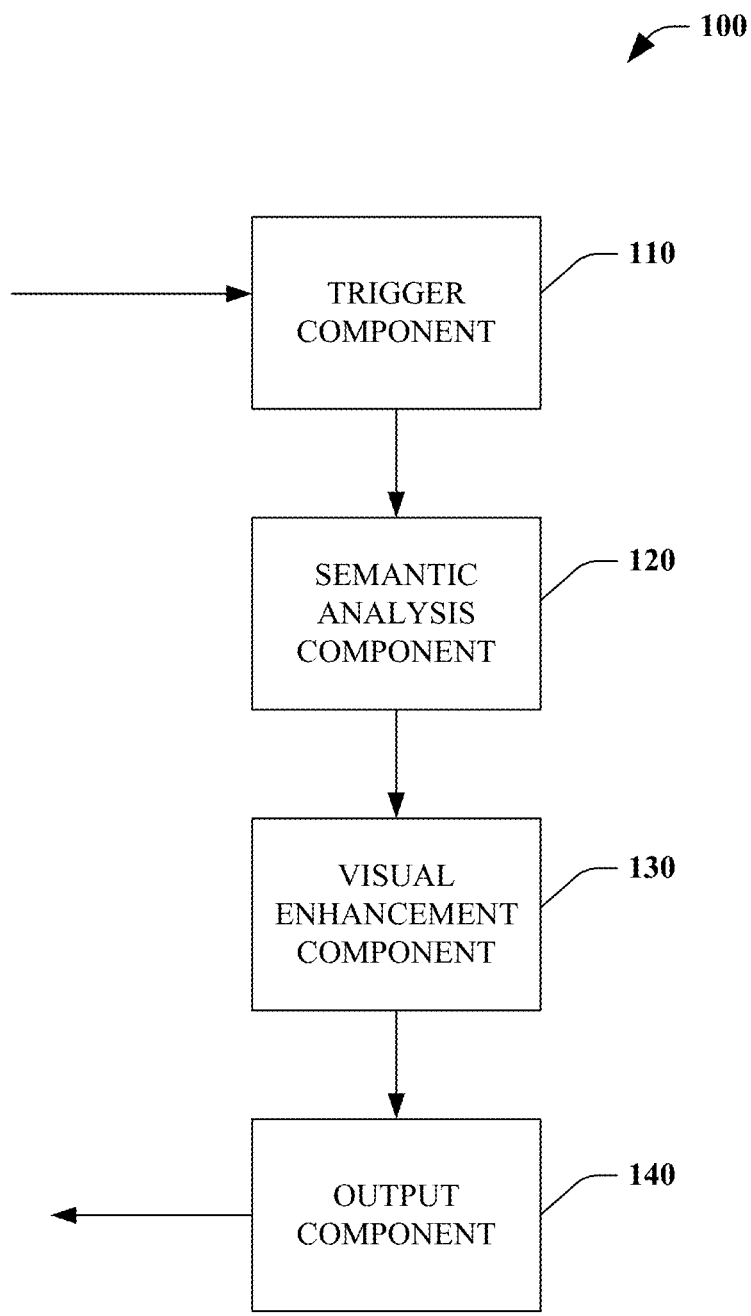
FIG. 1 is a functional block diagram that illustrates a system for visually enhancing digital ink of an electronic document.
Figure 2A:
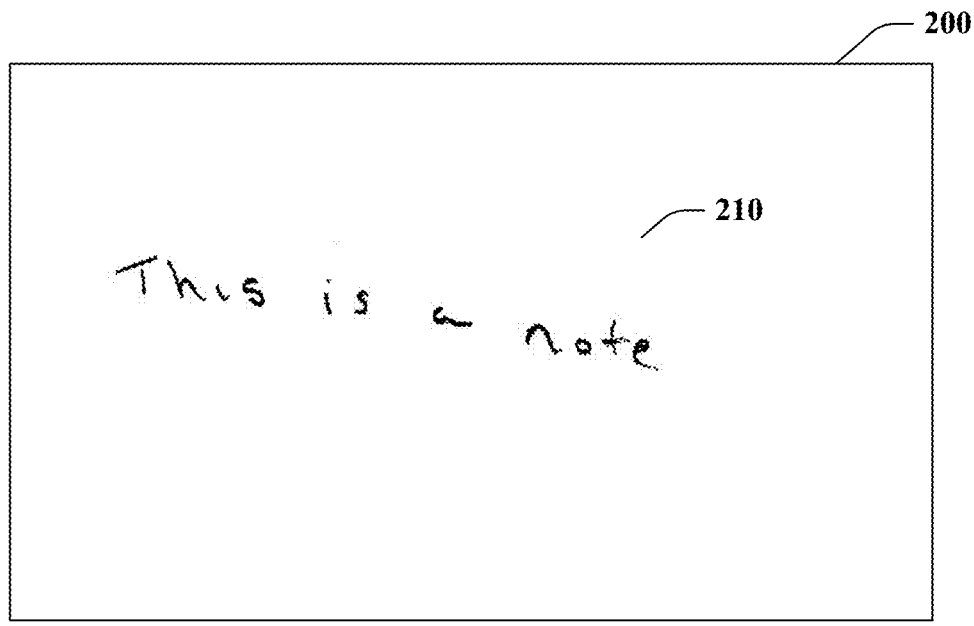
FIGS. 2A-11 are exemplary user interfaces that illustrate exemplary visual enhancements to digital ink.
Figure 2B:
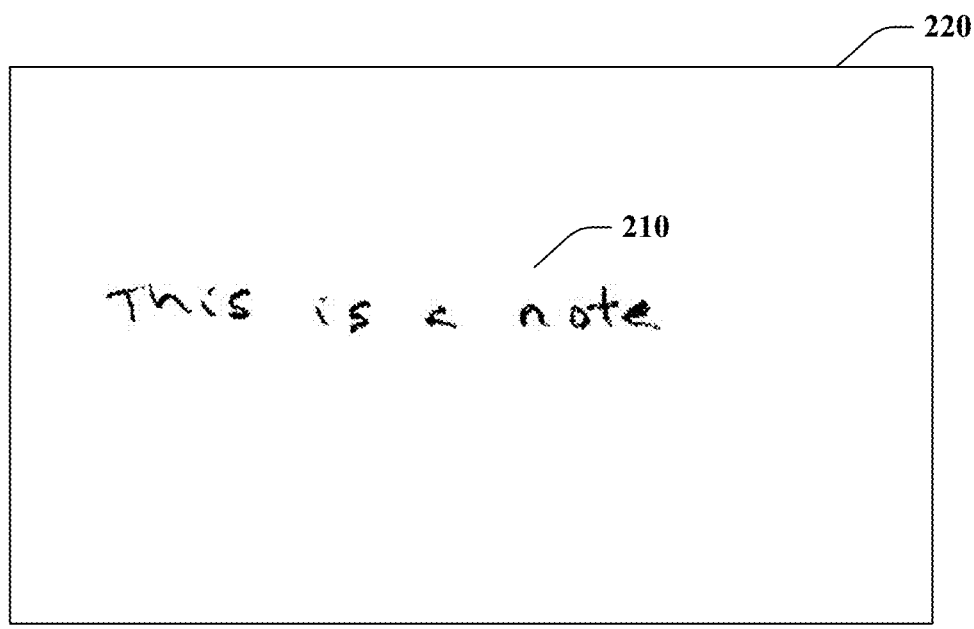

Various technologies pertaining to visual enhancing digital ink of electronic document(s) are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding visually enhancing digital ink of electronic document(s). What follows are one or more exemplary systems and methods.

Aspects of the subject disclosure pertain to the technical problem of displaying digital ink. The technical features associated with addressing this problem involve receive a trigger to visually enhance digital ink of a portion of an electronic document. In response to the received trigger, the digital ink of the portion of the electronic document is analyzed to determine a semantic structure of the digital ink. The digital ink of the portion of the electronic document is visually enhanced in accordance with the determined semantic structure. The visually enhanced digital ink of the portion of the electronic document is provided (e.g., displayed). Accordingly, aspects of these technical features exhibit technical effects of more efficiently and effectively displaying digital ink thus reducing computer resource(s) and/or increasing user satisfaction.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

Ink (also called "digital ink" or "electronic ink") comprises a sequence or set of handwritten strokes. A sequence of strokes may include strokes in an ordered form. The sequence may be ordered in any suitable manner, such as by the time the stroke was captured and/or by where the stroke appears on a page. Other orders are possible.

With increasing frequency, computer users are using their computer systems for digital notetaking using an electronic pen or stylus. These notes can be taken casually or quickly resulting in content that is not well-organized and/or easy to follow.

Described herein are techniques for visually enhancing digital ink within an electronic document. In some embodiments, the techniques can be triggered explicitly by a user and/or inferred based upon user-configurable setting(s) and/ or a particular user's previous history. In response to the trigger, the digital ink is analyzed to determine a semantic structure.

The digital ink of the electronic document can be visually enhanced in accordance with the determined semantic structure of the digital ink. In some embodiments, visual enhancement can include adjusting digital ink to be displayed horizontally, aligning line(s), aligning word in a particular line using a baseline, adjusting vertical spacing of lines, paragraphs, and/or lists, adjusting spacing between words and/or list items in a particular line, modifying ink styling (e.g., ink size, ink thickness, ink color), adjusting sizing of characters in a same group, unifying ink color, and/or unifying ink thickness.

In some embodiments, the determined semantic structure can further be utilized to modify display of the digital ink based upon display characteristic(s) of a particular device. For example, digital ink created on a display of a laptop may not be displayed conveniently on a tablet device causing a user to pan-and-zoom many times to read a particular page of the document. Using the determined semantic structure and the display characteristic(s) (e.g., display size of a target device), display of the digital ink can be modified. In some embodiments, digital ink of a particular line can be re-flowed onto another line in order to enhance the user's viewing experience. In some embodiments, display of secondary content (e.g., annotation(s), comment(s) and/or call-out(s)) can be modified, for example, moved to another display location and/or minimized from view.

Referring to FIG. 1, a system for visually enhancing digital ink of an electronic document 100 is illustrated. In some embodiments, the system 100 can be utilized to visually enhance digital ink, while keeping ink as ink, that is, without converting the digital ink to a textual representation.

The system 100 includes a trigger component 110 that receives a trigger to visually enhance digital ink within at least a portion of the electronic document. In some embodiments, the trigger is an explicit command invoked by a user (e.g., visual enhancement control displayed in ribbon of application). In some embodiments, the trigger is inferred based upon user-configurable setting(s). For example, a user can configure the trigger component 110 to trigger visual enhancement based upon expiration of a predetermined period of time, a predetermined period of user inactivity time, and/or a predetermined quantity of digital ink on the electronic document. In some embodiments, the trigger is inferred based upon a particular user's previous history of visually enhancing digital ink within electronic documents.

In some embodiments, digital ink within an entire document is visually enhanced. In some embodiments, digital ink of a predetermined portion of an electronic document is visually enhanced (e.g., a page). In some embodiments, digital ink of a user-selected portion of an electronic document is visually enhanced (e.g., user employs lasso-type selection mechanism to select digital ink to be visually enhanced).

The system 100 further include a semantic analysis component 120 that, in response to the received trigger, analyzes the digital ink of the portion of the electronic document to determine a semantic structure of the digital ink of the portion of the electronic document. In some embodiments, the semantic analysis component 120 can first perform classification analysis to determine the type(s) of strokes included in the specific input data (e.g., whether individual strokes or stroke sets represent flow diagrams, freeform drawings, text, music, mathematics, charts, graphs, etc.). In some embodiments, the semantic analysis component 120 can utilize a parse tree which is a data structure representing the structure of the electronic document with the electronic document parsed into blocks, lines, words, and/or individual strokes.

In some embodiments, the semantic analysis component 120 can further employ one or more parse engines, for example, with each focusing on a particular task. In some embodiments, the semantic analysis component 120 can include individual parse engines for temporal line grouping, spatial block grouping, spatial line grouping, list detection, and/or spatial word grouping. In some embodiments, a parse engine takes a parse tree data structure as input and modifies it (if appropriate) to produce a parse tree with a different data structure, which in turn may be passed along as input to the next parse engine. Thus, the semantic analysis component 120 can ascertain certain information relating to the layout of ink strokes within the portion of the electronic document.

In some embodiments, the semantic analysis component 120 can perform layout analysis to combine and parse individual input strokes into associated stroke sets, such as words, lines, blocks, and/or other groupings. Based upon the layout analysis and the classification analysis, the semantic component 120 can determine a semantic structure of the digital ink of the portion of the document. In some embodiments, the semantic structure further includes identifying digital ink comprising secondary content (e.g., annotations and/or callouts).

The system 100 includes a visual enhancement component 130 that visually enhances the digital ink of the electronic document in accordance with the determined semantic structure. The system 100 further includes an output component 140 that provides (e.g., displays) the visually enhanced digital ink of the electronic document. In some embodiments, the output component 140 can further store the visually enhanced digital ink of the electronic document.

In some embodiments, visual enhancement can include horizontal line adjustment, aligning line(s), aligning word in a particular line using a baseline, adjusting vertical spacing of lines, paragraphs, and/or lists, adjusting spacing between words and/or list items in a particular line, modifying ink styling (e.g., ink size, ink thickness, ink color), adjusting sizing of characters in a same group, unifying ink color, and/or unifying ink thickness. In some embodiments, one or more template(s) can be utilized that define visual enhancement setting(s), for example, based upon common combination(s), user-configurable setting(s), user history with the system 100, group(s), and/or entity(ies).

By way of explanation and not limitation FIGS. 2-11 illustrate exemplary visual enhancements to digital ink by the system 100. FIG. 2A is a user interface 200 that illustrates digital ink 210. In this example, the digital ink 210 has been entered at an angle off of horizontal. FIG. 2B illustrates a user interface 220 in which digital ink 210 has been visually enhanced by the system 100 to be substantially horizontal.

Figure 3A:
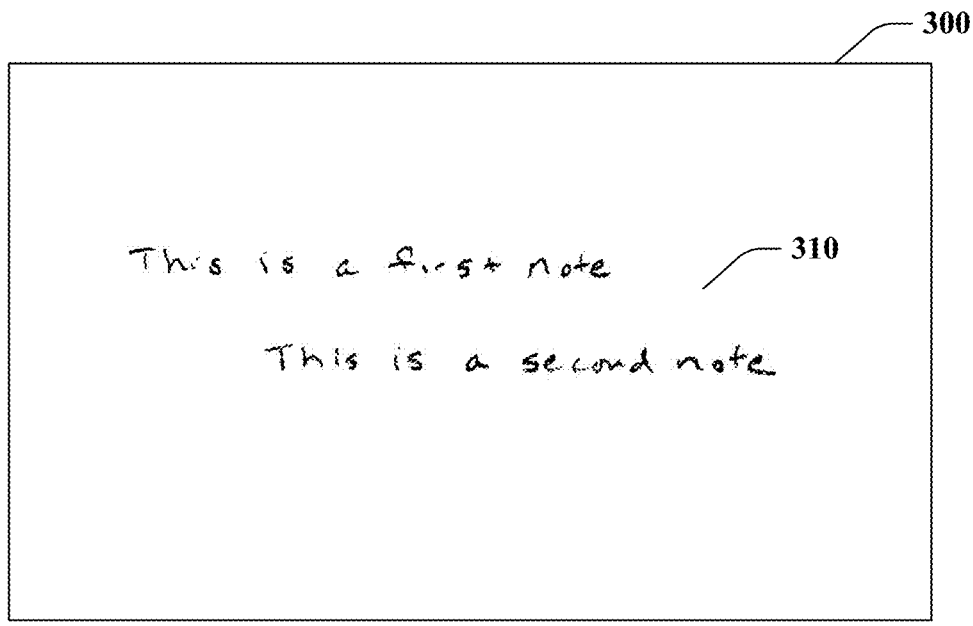
Figure 3B:
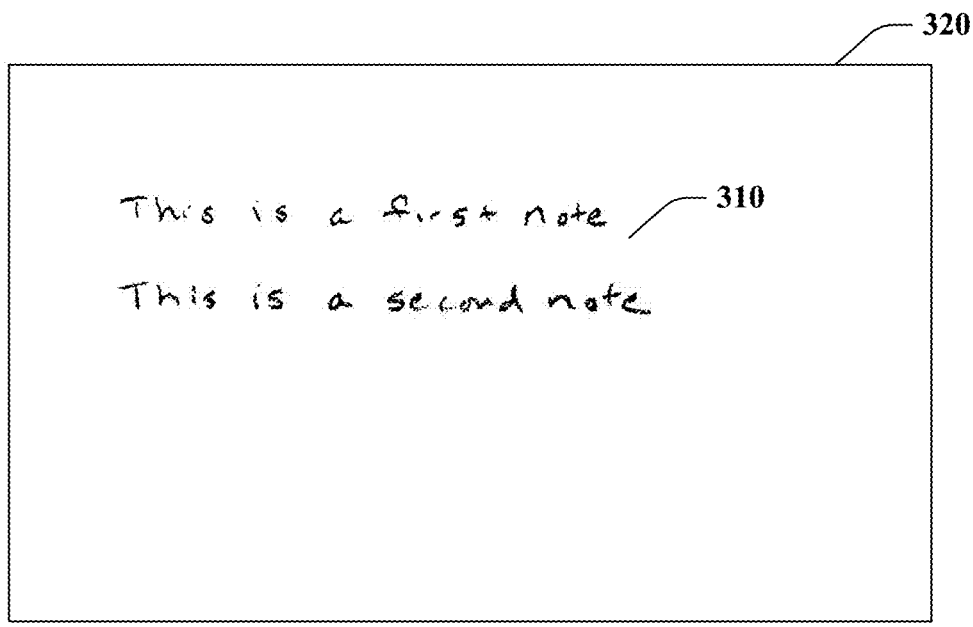

FIG. 3A is a user interface 300 that illustrates a digital ink 310 comprising two lines of non-aligned ink. FIG. 3B illustrates a user interface 320 in which the digital ink 310 has been visually enhanced by the system 100 to be left aligned.

Figure 4A:
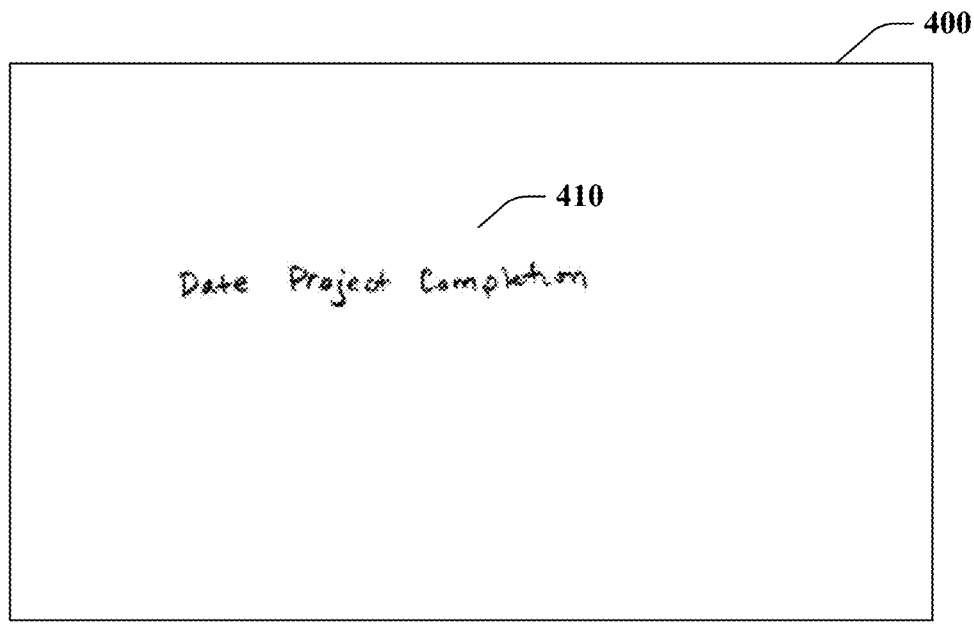
Figure 4B:
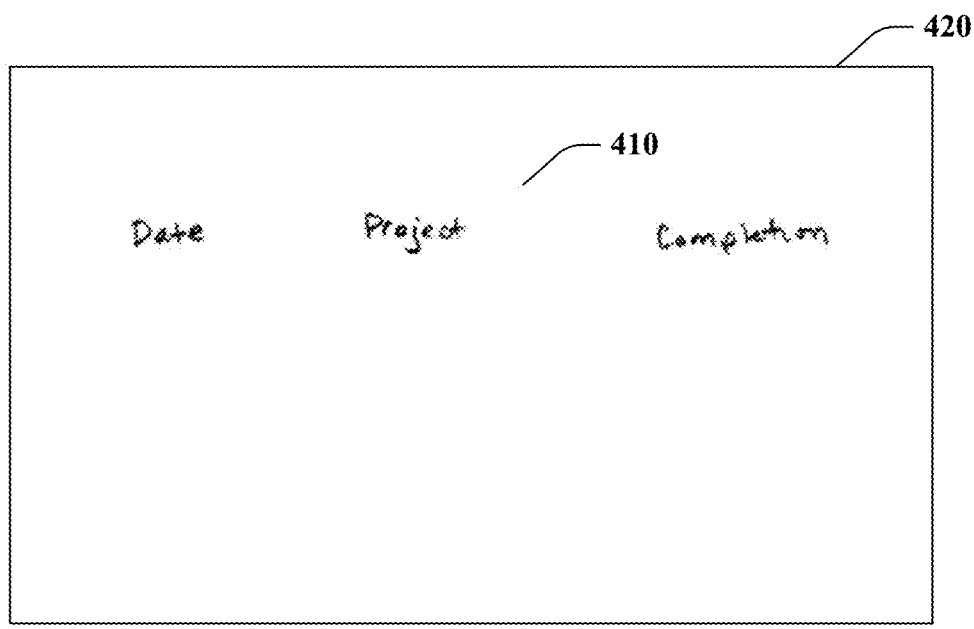

FIG. 4A is a user interface 400 that illustrates a digital ink 410 comprising a handwritten note. FIG. 4B illustrates a user interface 420 in which the digital ink 410 has been visually enhanced by the system 100 in which the words in the same line are auto-aligned by a same baseline.

Figure 5A:
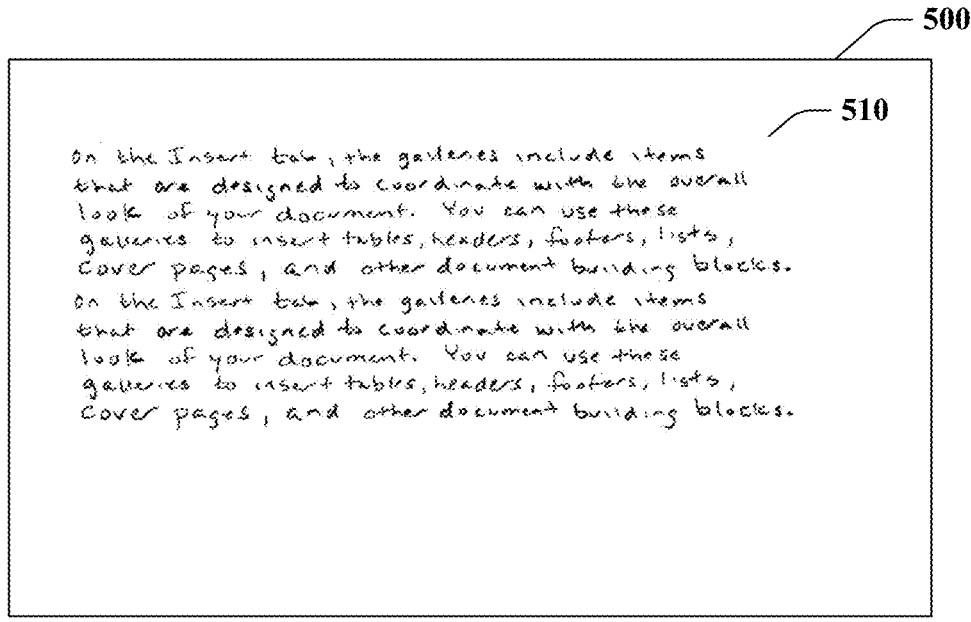
Figure 5B:
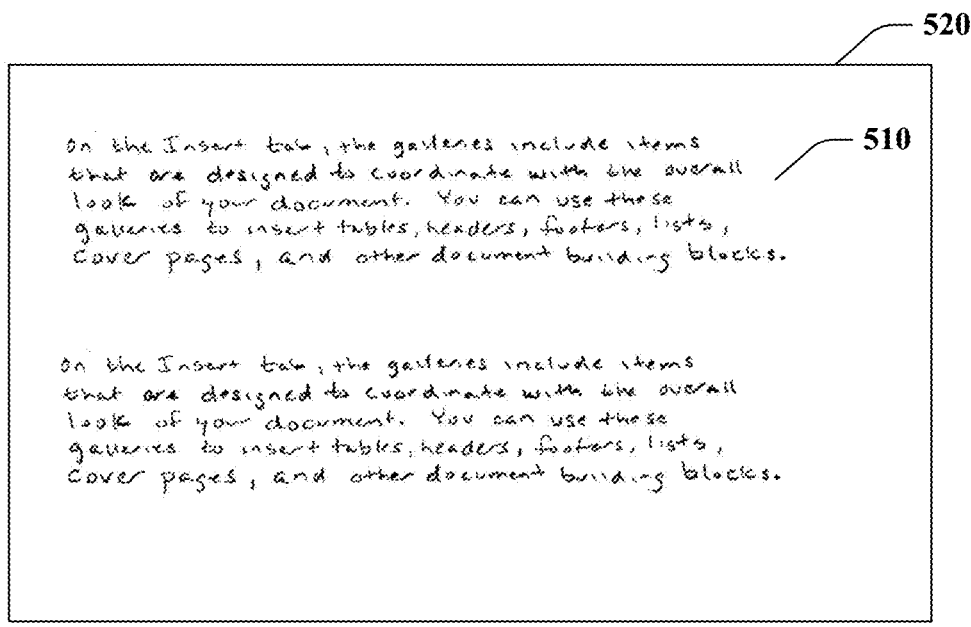

FIG. 5A is a user interface 500 that illustrates a digital ink 510 comprising two paragraphs. FIG. 5B illustrates a user interface 520 in which the digital ink 510 has been visually enhanced by the system 100 to include vertical spacing between the two paragraphs.

Figure 6A:
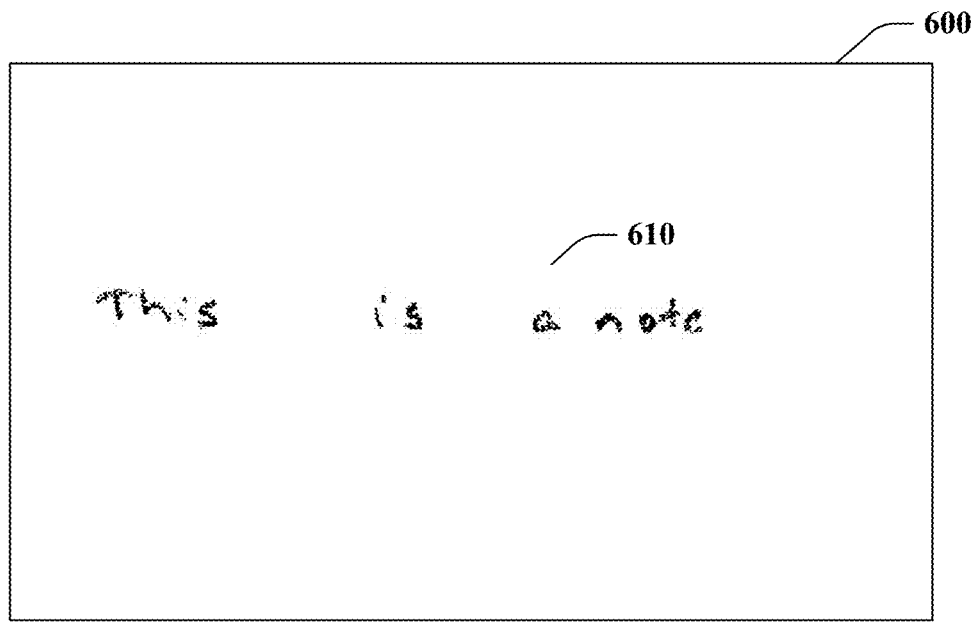
Figure 6B:
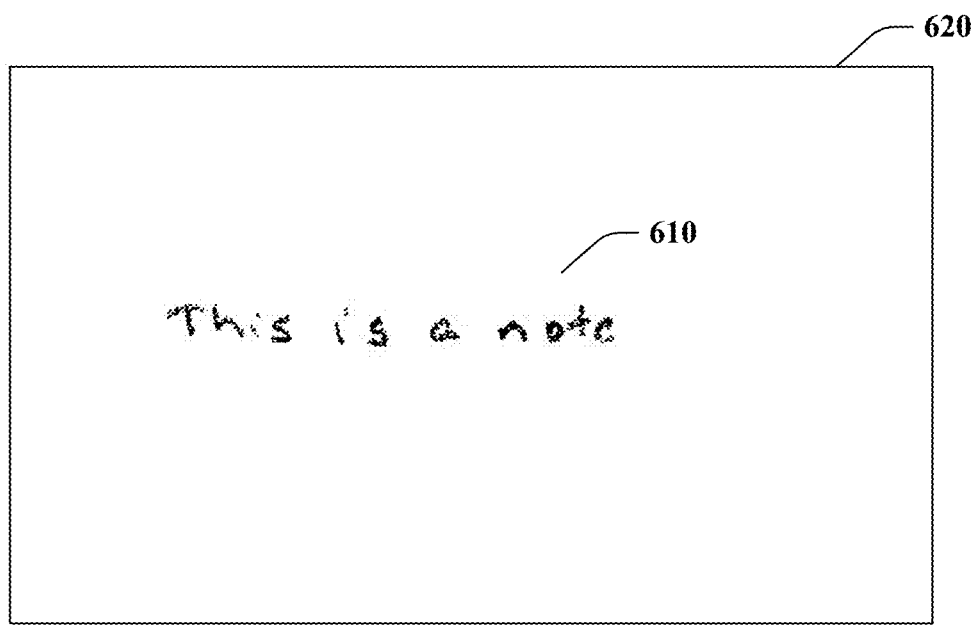

FIG. 6A is a user interface 600 that illustrates a digital ink 610 comprising a lines of ink. FIG. 6B illustrates a user interface 620 in which the digital ink 610 has been visually enhanced by the system 100 to include auto-spacing between words and/or list items in a same line horizontally.

Figure 7A:
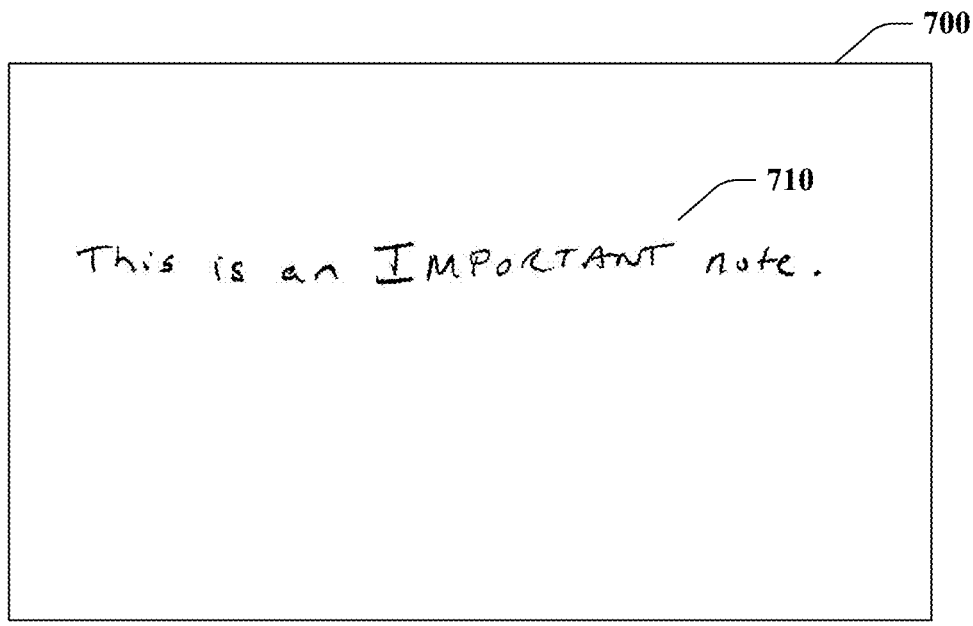
Figure 7B:
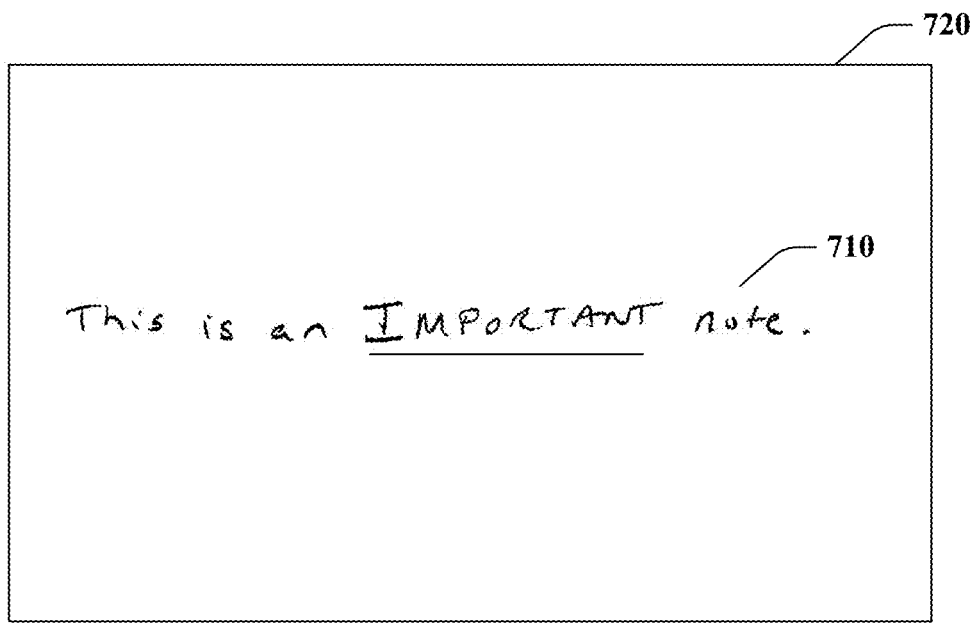

FIG. 7A is a user interface 700 that illustrates a digital ink 710 comprising two lines of ink. FIG. 7B illustrates a user interface 720 in which the digital ink 710 has been visually enhanced by the system 100 to include auto-ink styling based on ink size, thickness, and/or color (e.g., underlining, heading, italics, highlighting).

Figure 8A:
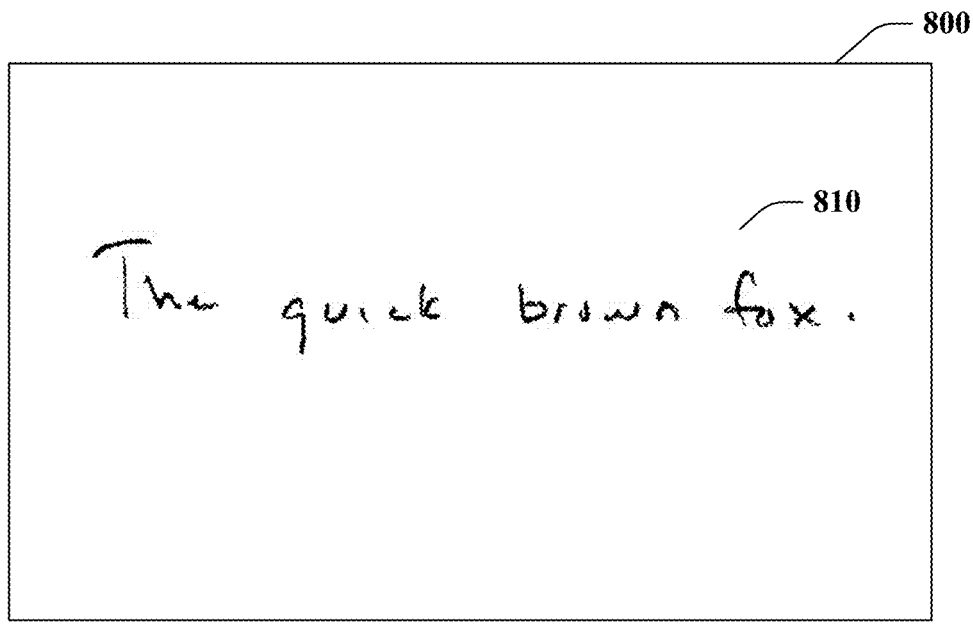
Figure 8B:
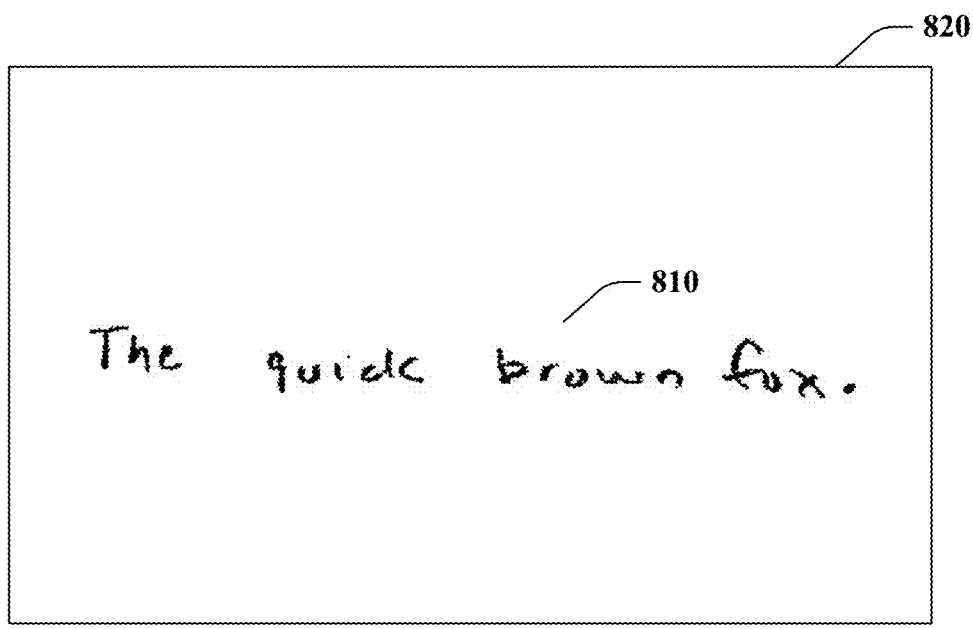

FIG. 8A is a user interface 800 that illustrates a digital ink 810 comprising a line of ink. FIG. 8B illustrates a user interface 820 in which the digital ink 810 has been visually enhanced by the system 100 to auto-size characters in a same group.

Figure 9A:
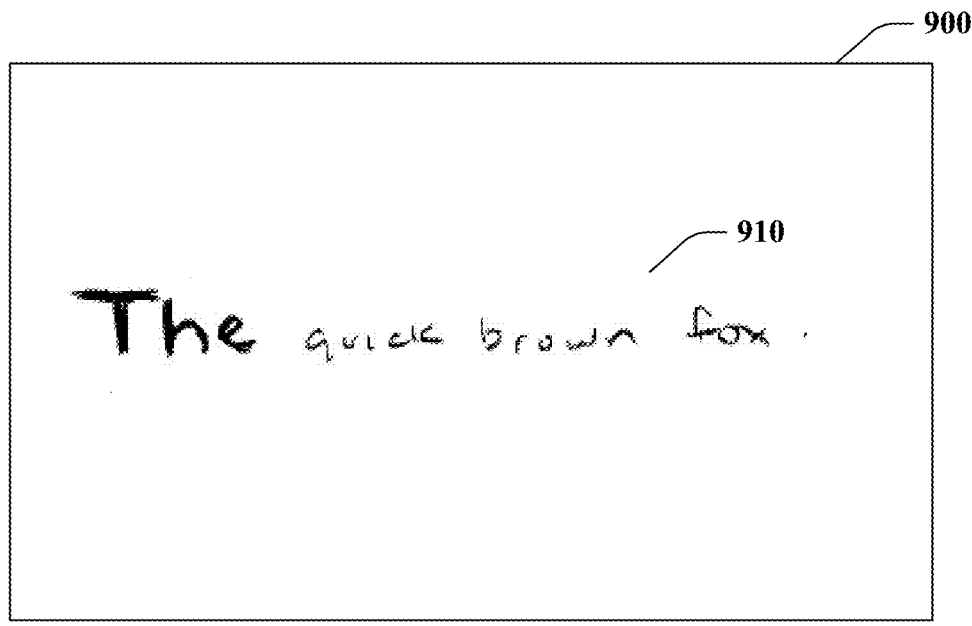
Figure 9B:
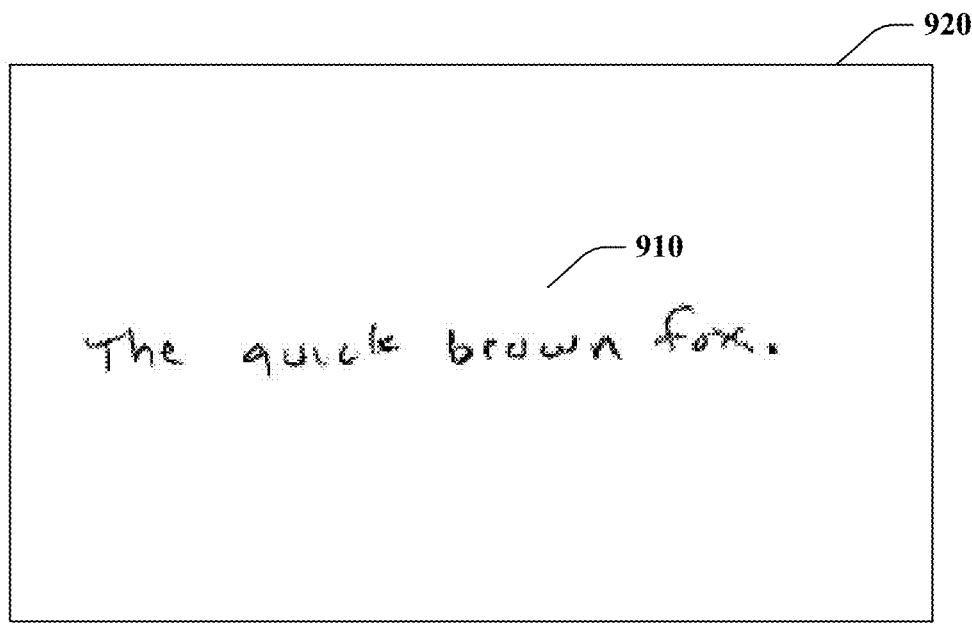

FIG. 9A is a user interface 900 that illustrates a digital ink 810 comprising a line of ink. FIG. 9B illustrates a user interface 920 in which the digital ink 910 has been visually enhanced by the system 100 to unify ink thickness and/or coloring.

Figure 10A:
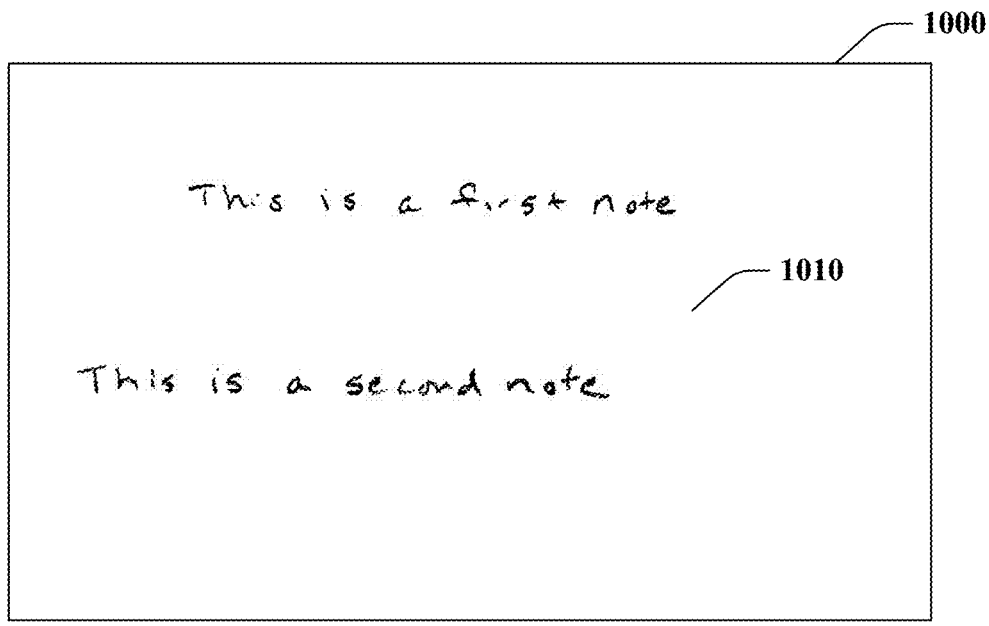
Figure 10B:
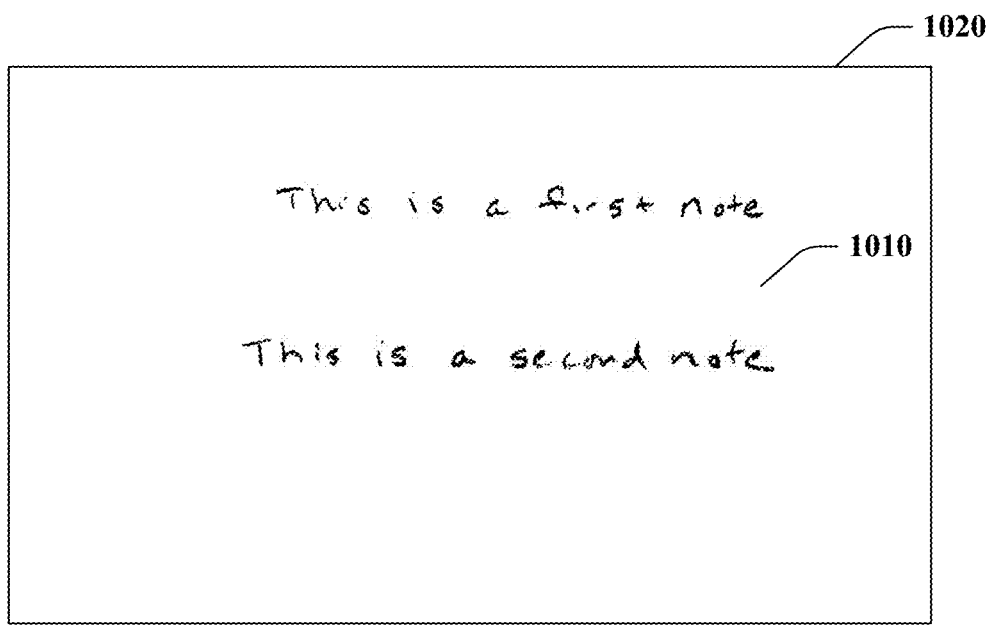

FIG. 10A is a user interface 1000 that illustrates a digital ink 1110 comprising two lines of ink. FIG. 10B illustrates a user interface 1020 in which the digital ink 1010 has been visually enhanced by the system 100 with manual user input (e.g., to vertically align).

Figure 11:
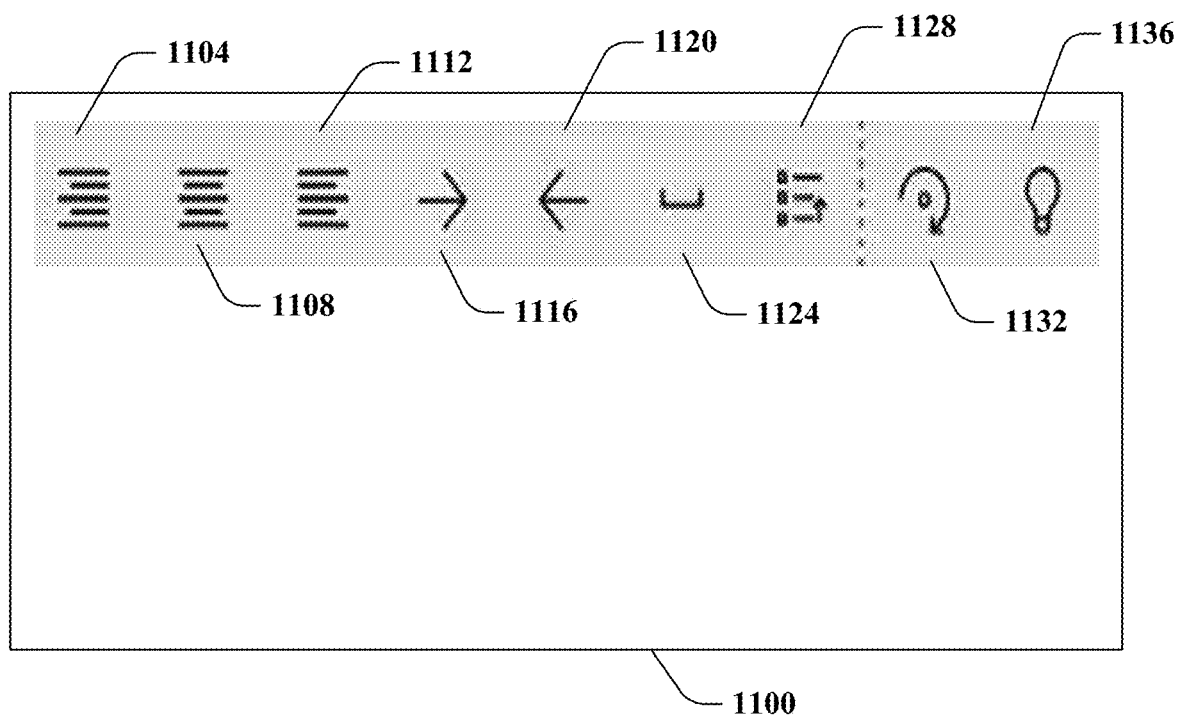

Turning to FIG. 11, a user interface 1100 that a plurality of exemplary user controls that can be invoked to trigger visual enhancement of digital ink (e.g., selected portion, page, and/or document). By way of explanation and not limitation, the user interface 1100 nine controls. A first control 1104 invokes the system 100 to left align the digital ink. A second control 1108 invokes the system 100 to center the digital ink. A third control 1112 invokes the system 100 to left alight the digital ink.

A fourth control 1116 invokes the system 100 to indent right the digital ink. A fifth control 1120 invokes the system 100 to indent left the digital ink. A sixth control 1124 invokes the system 100 to spatially align words.

A seventh control 1128 invokes the system 100 to create a bullet point list using the digital ink. An eighth control 1132 invokes the system 100 to rotate the digital ink. A ninth control 1136 invokes the system 100 to visually enhance the digital ink (e.g., based on default setting(s) and/or user-configurable setting(s)).

Figure 12:
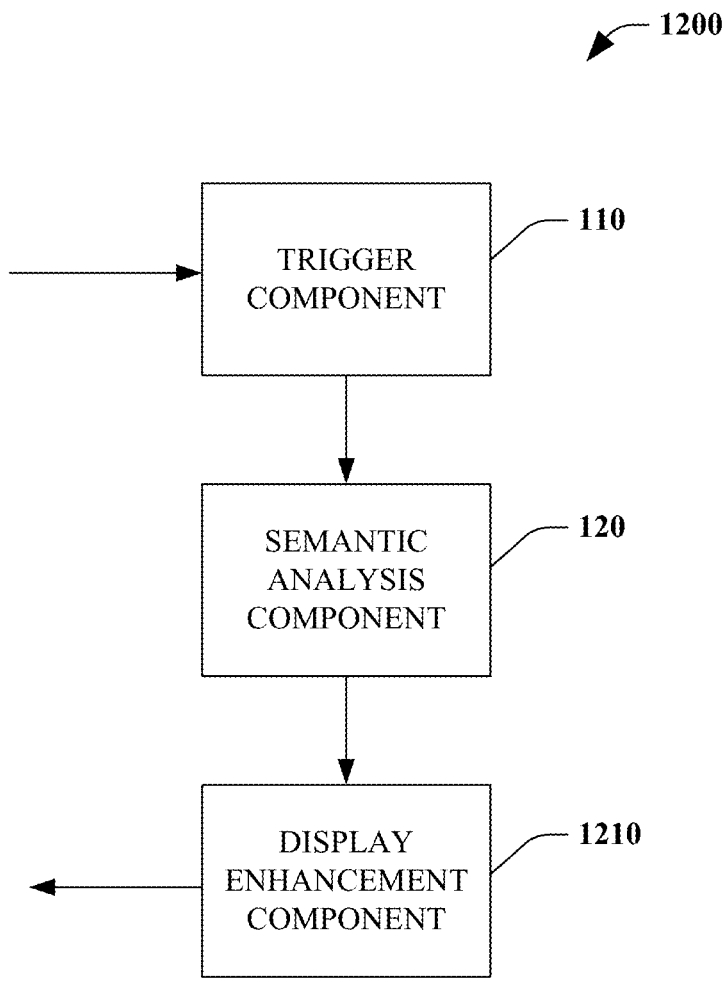
FIG. 12 is a functional block diagram that illustrates a system for displaying digital ink of an electronic document.

Turning to FIG. 12, a system for displaying digital ink of an electronic document 1200 is illustrated. The system 1200 includes a display enhancement component 120 that can employ the determined semantic structure provided by the semantic analysis component 120, discussed above, to modify display of the digital ink based upon display characteristic(s) of a particular device. For example, digital ink created on a display of a laptop may not be displayed conveniently on a tablet device causing a user to pan-and-zoom many times to read a particular page of the document. Using the determined semantic structure and the display characteristic(s) (e.g., display size of a target device), a display enhancement component can cause display of the digital ink to be modified. In some embodiments, digital ink of a particular line can be re-flowed onto another line in order to enhance the user's viewing experience. In some embodiments, display of secondary content (e.g., annotation(s) and/or callout(s)) can be modified, for example, moved to another display location and/or minimized from view.

Figure 13:
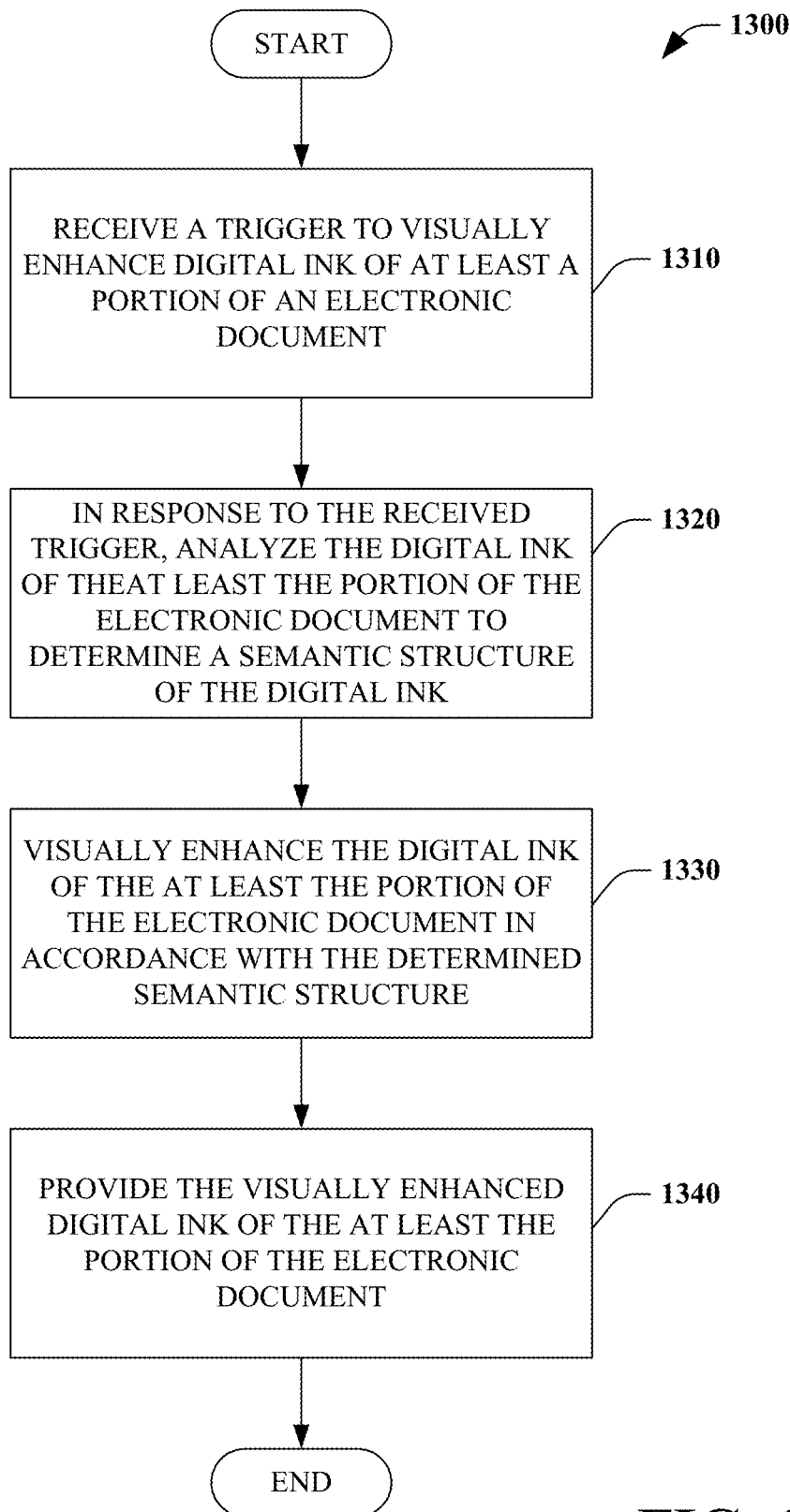
FIG. 13 is a flow chart that illustrates a method of visually enhancing digital ink of an electronic document.
Figure 14:
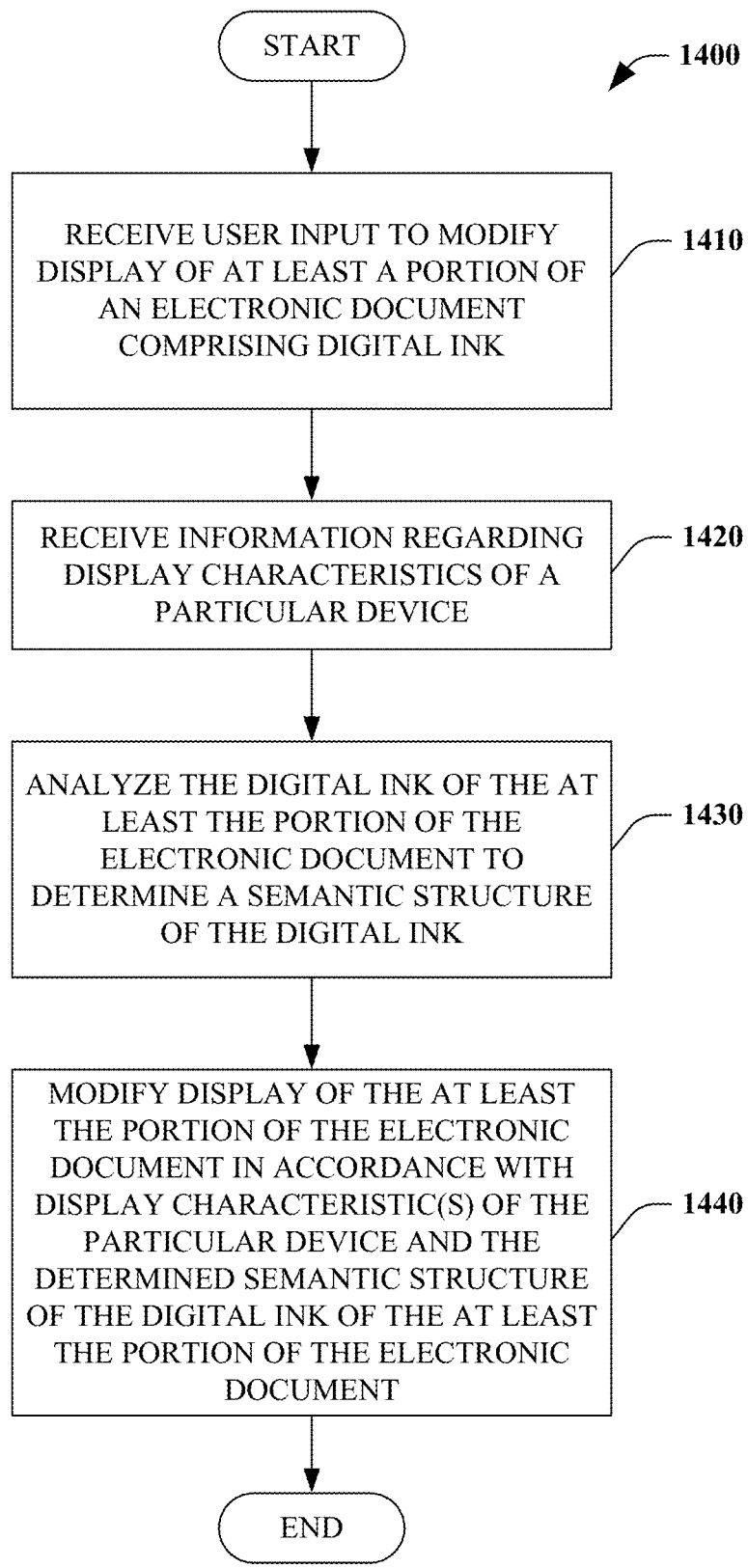
FIG. 14 is a flow chart that illustrates a method of visually enhancing digital ink of an electronic document.
Figure 15:
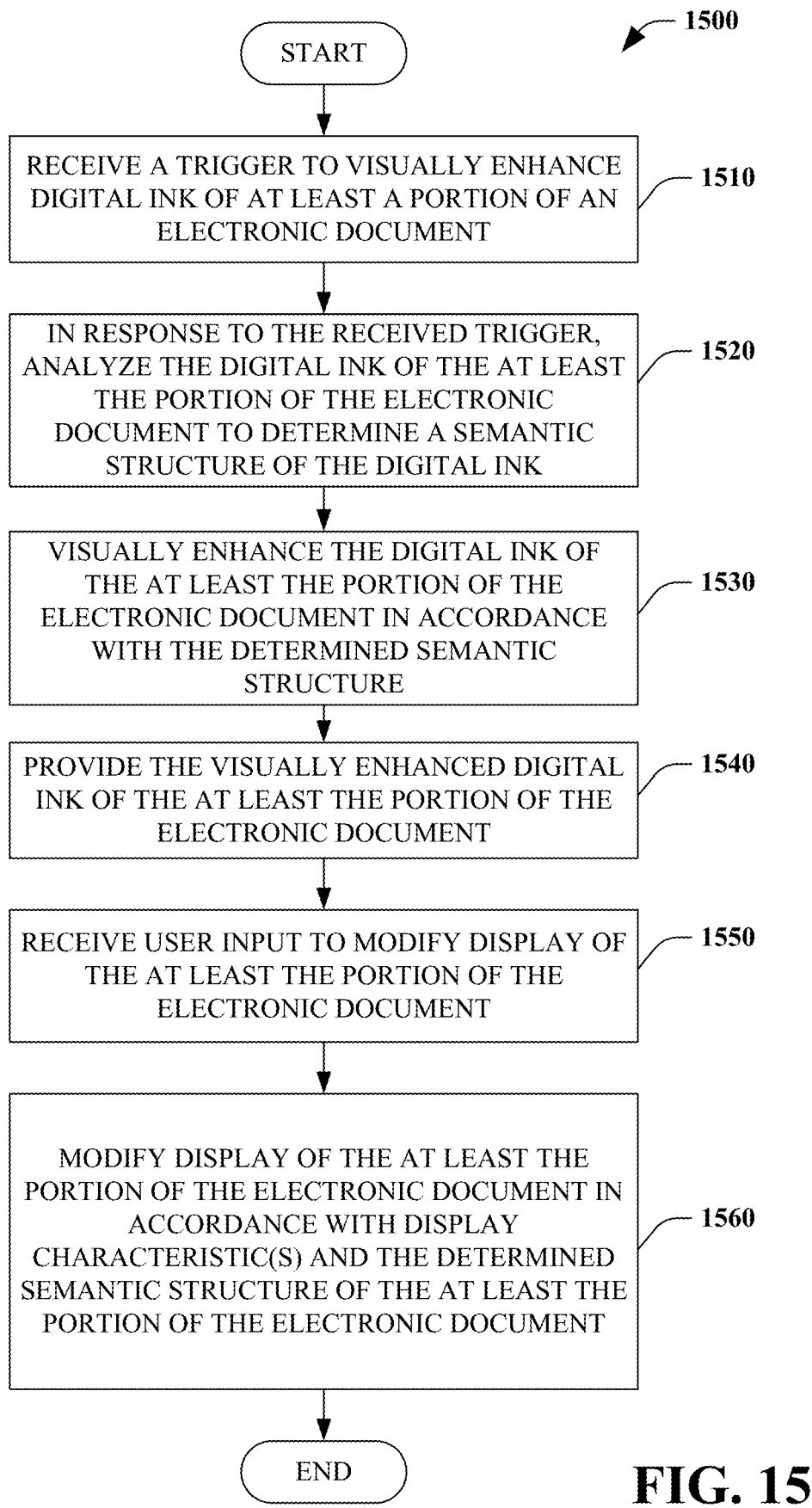
FIG. 15 is a flow chart that illustrates a method of visually enhancing digital ink of an electronic document.

FIGS. 13-15 illustrate exemplary methodologies relating to visually enhancing digital ink. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 13, a method of visually enhancing digital ink of an electronic document 1300 is illustrated. In some embodiments, the method 1300 is performed by the system 100.

At 1310, a trigger to visually enhance digital ink of at least a portion of an electronic document is received. At 1320, in response to the received trigger, the digital ink of the at least the portion of the electronic document is analyzed to determine a semantic structure of the digital ink.

At 1330, the digital ink of the at least the portion of the electronic document is visually enhanced in accordance with the determined semantic structure. At 1340, the visually enhanced digital ink of the at least the portion of the electronic document is provided (e.g., displayed and/or stored).

Next, turning to FIG. 14, a method of visually enhancing digital ink of an electronic document 1400 is illustrated. In some embodiments, the method 1400 is performed by the system 100.

At 1410, user input to modify display of at least a portion of an electronic document comprising digital ink is received. At 1420, information regarding display characteristics of a particular device is received.

At 1430, the digital ink of the at least the portion of the electronic document is analyzed to determine a semantic structure of the digital ink. At 1440, display of the at least the portion of the electronic document is modified in accordance with the display characteristic(s) of the particular device and the determined semantic structure of the digital ink of the at least the portion of the electronic document.

Referring to FIG. 15, a method of visually enhancing digital ink of an electronic document 1500 is illustrated. In some embodiments, the method 1500 is performed by the system 100 and/or the system 1200.

At 1510, a trigger to visually enhance digital ink of at least a portion of an electronic document is received. At 1520, in response to the received trigger, the digital ink of the at least the portion of the electronic document is analyzed to determine a semantic structure of the digital ink.

At 1530, the digital ink of the at least the portion of the electronic document is visually enhanced in accordance with the determined semantic structure. At 1540, the visually enhanced digital ink of the at least the portion of the electronic document is provided (e.g., displayed and/or stored).

At 1550, user input to modify display of at least the portion of an electronic document comprising digital ink is received. At 1560, display of the at least the portion of the electronic document is modified in accordance with the display characteristic(s) (e.g., of a particular device and/or received from a user) and the determined semantic structure of the digital ink of the at least the portion of the electronic document.

Described herein is a system for visually enhancing digital ink of an electronic document, comprising: a processing system comprising a processor and a memory having computer-executable instructions stored thereupon which, when executed by the processor, cause the computer to: receive a trigger to visually enhance digital ink of at least a portion of the electronic document; analyze the digital ink of the at least the portion of the electronic document to determine a semantic structure of the digital ink in response to the received trigger; visually enhance the digital ink of the portion of the at least the portion of the electronic document in accordance with the determined semantic structure; and provide the visually enhanced digital ink of the at least the portion of the electronic document.

The system can include wherein the trigger is a command invoked by a user. The system can include wherein the trigger is inferred based upon a user-configurable setting. The system can include wherein the user-configurable setting comprises at least one of an expiration of a predetermined period of time, a predetermined period of user inactivity time, a predetermined quantity of digital ink on the electronic document.

The system can include wherein the trigger is inferred based upon a particular user's previous history of visually enhancing digital ink within electronic documents. The system can include wherein the semantic structure of the digital ink is based upon layout analysis to combine and parse individual input strokes into associated stroke sets. The system can include wherein the semantic structure of the digital ink is further based upon classification analysis to determine types of strokes included in the digital ink.

The system can include wherein the visual enhancement comprises at least one of horizontal line adjustment, line alignment, word alignment in a particular line using a particular baseline, vertical spacing adjustment of lines, vertical spacing adjustment of paragraphs, vertical spacing adjustment of a list, spacing adjustment between words, spacing adjustment between list items, ink styling modification, adjusting sizing of characters adjustment, ink color unification, or ink thickness unification.

The system can include the memory having further computer-executable instructions stored thereupon which, when executed by the processor, cause the computer to: receive user input to modify display of the portion of the electronic document based upon a display characteristic of a particular device; and modify the display of the at least the portion of the electronic document in accordance with the display characteristic of the particular device and the determined semantic structure of the at least the portion of the electronic document. The system can include wherein modify the display comprises at least one of reflow of a portion of a line onto another line, minimization of display of secondary content, or change of display location of secondary content.

Described herein is a method of visually enhancing digital ink of an electronic document, comprising: receiving a trigger to visually enhance digital ink of at least a portion of the electronic document; analyzing the digital ink of the at least the portion of the electronic document to determine a semantic structure of the digital ink in response to the received trigger; visually enhancing the digital ink of the portion of the at least the portion of the electronic document in accordance with the determined semantic structure; and providing the visually enhanced digital ink of the at least the portion of the electronic document.

The method can include wherein the trigger is a command invoked by a user. The method can include wherein the trigger is inferred based upon a user-configurable setting. The method can include wherein the user-configurable setting comprises at least one of an expiration of a predetermined period of time, a predetermined period of user inactivity time, a predetermined quantity of digital ink on the electronic document.

The method can include wherein the semantic structure of the digital ink is based upon layout analysis to combine and parse individual input strokes into associated stroke sets. The method can include wherein the semantic structure of the digital ink is further based upon classification analysis to determine types of strokes included in the digital ink. The method can include wherein the visual enhancement comprises at least one of horizontal line adjustment, line alignment, word alignment in a particular line using a particular baseline, vertical spacing adjustment of lines, vertical spacing adjustment of paragraphs, vertical spacing adjustment of a list, spacing adjustment between words, spacing adjustment between list items, ink styling modification, adjusting sizing of characters adjustment, ink color unification, or ink thickness unification.

Described herein is a computer storage media storing computer-readable instructions that when executed cause a computing device to: receive a trigger to visually enhance digital ink of at least a portion of the electronic document; analyze the digital ink of the at least the portion of the electronic document to determine a semantic structure of the digital ink in response to the received trigger; visually enhance the digital ink of the portion of the at least the portion of the electronic document in accordance with the determined semantic structure; and provide the visually enhanced digital ink of the at least the portion of the electronic document.

The computer storage media can include wherein the visual enhancement comprises at least one of horizontal line adjustment, line alignment, word alignment in a particular line using a particular baseline, vertical spacing adjustment of lines, vertical spacing adjustment of paragraphs, vertical spacing adjustment of a list, spacing adjustment between words, spacing adjustment between list items, ink styling modification, adjusting sizing of characters adjustment, ink color unification, or ink thickness unification. The computer storage media can include store further computer-readable instructions that when executed cause a computing device to: receive user input to modify display of the portion of the electronic document based upon a display characteristic of a particular device; and modify the display of the at least the portion of the electronic document in accordance with the display characteristic of the particular device and the determined semantic structure of the at least the portion of the electronic document.

Figure 16:
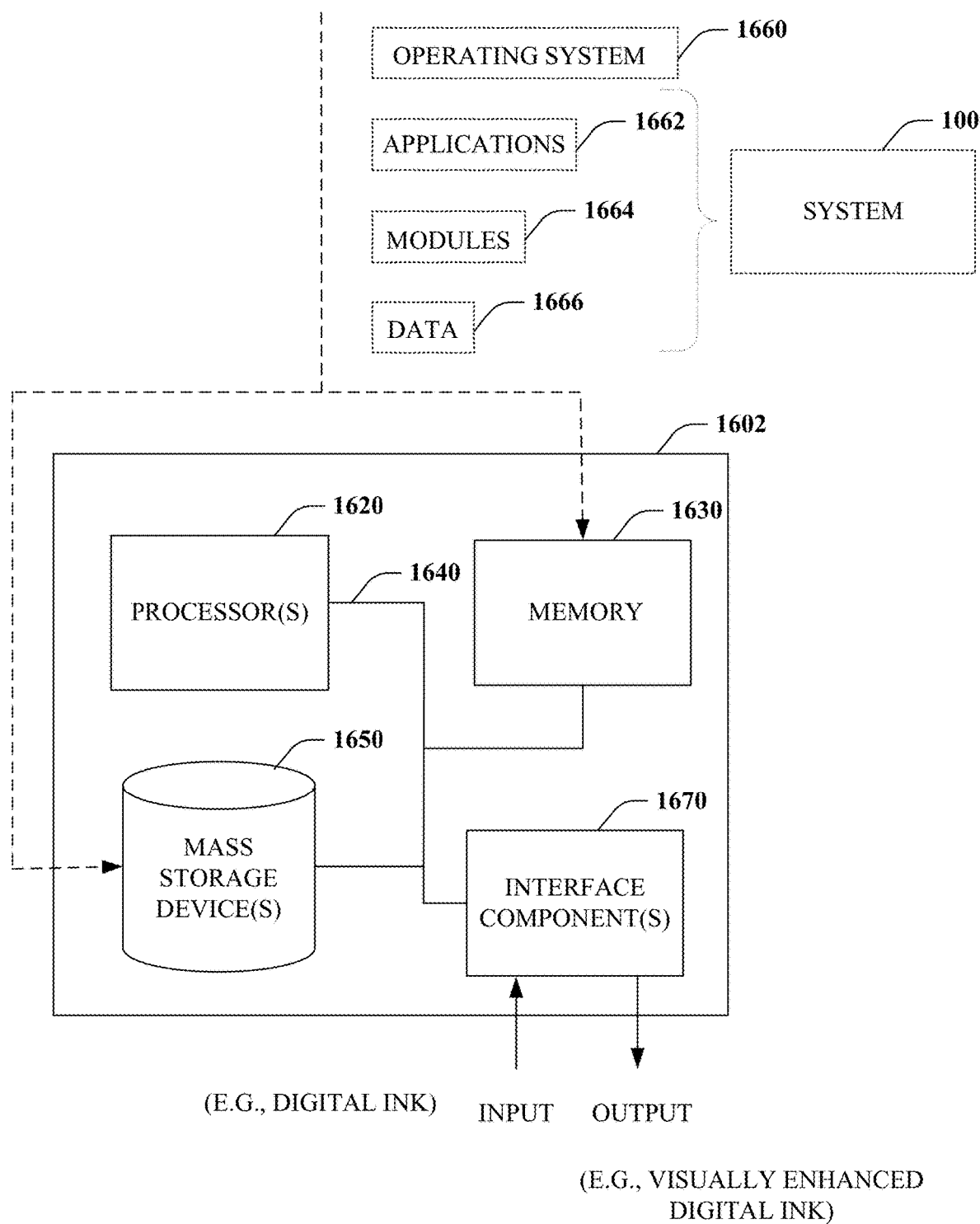
FIG. 16 is a functional block diagram that illustrates an exemplary computing system.

With reference to FIG. 16, illustrated is an example general-purpose processing system, computer or computing device 1602 (e.g., mobile phone, desktop, laptop, tablet, watch, server, hand-held, programmable consumer or industrial electronics, set-top box, game system, compute node, etc.). For instance, the computing device 1602 may be used in a system for visually enhancing digital ink of an electronic document 100 and/or a system for displaying digital ink of an electronic document 1200.

The computer 1602 includes one or more processor(s) 1620, memory 1630, system bus 1640, mass storage device(s) 1650, and one or more interface components 1670. The system bus 1640 communicatively couples at least the above system constituents. However, it is to be appreciated that in its simplest form the computer 1602 can include one or more processors 1620 coupled to memory 1630 that execute various computer executable actions, instructions, and or components stored in memory 1630. The instructions may be, for instance, instructions for implementing functionality described as being carried out by one or more components discussed above or instructions for implementing one or more of the methods described above.

The processor(s) 1620 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1620 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 1620 can be a graphics processor.

The computer 1602 can include or otherwise interact with a variety of computer-readable media to facilitate control of the computer 1602 to implement one or more aspects of the claimed subject matter. The computer-readable media can be any available media that can be accessed by the computer 1602 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 1602. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 1630 and mass storage device(s) 1650 are examples of computer-readable storage media. Depending on the exact configuration and type of computing device, memory 1630 may be volatile (e.g., RAM), non-volatile (e.g., ROM, flash memory, etc.) or some combination of the two. By way of example, the basic input/output system (BIOS), including basic routines to transfer information between elements within the computer 1602, such as during start-up, can be stored in nonvolatile memory, while volatile memory can act as external cache memory to facilitate processing by the processor(s) 1620, among other things.

Mass storage device(s) 1650 includes removable/non-removable, volatile/non-volatile computer storage media for storage of large amounts of data relative to the memory 1630. For example, mass storage device(s) 1650 includes, but is not limited to, one or more devices such as a magnetic or optical disk drive, floppy disk drive, flash memory, solid-state drive, or memory stick.

Memory 1630 and mass storage device(s) 1650 can include, or have stored therein, operating system 1660, one or more applications 1662, one or more program modules 1664, and data 1666. The operating system 1660 acts to control and allocate resources of the computer 1602. Applications 1662 include one or both of system and application software and can exploit management of resources by the operating system 1660 through program modules 1664 and data 1666 stored in memory 1630 and/or mass storage device (s) 1650 to perform one or more actions. Accordingly, applications 1662 can turn a general-purpose computer 1602 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 1662, and include one or more modules 1664 and data 1666 stored in memory and/or mass storage device(s) 1650 whose functionality can be realized when executed by one or more processor(s) 1620.

In accordance with one particular embodiment, the processor(s) 1620 can correspond to a system on a chip (SOC) or like architecture including, or in other words integrating, both hardware and software on a single integrated circuit substrate. Here, the processor(s) 1620 can include one or more processors as well as memory at least similar to processor(s) 1620 and memory 1630, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 1602 also includes one or more interface components 1670 that are communicatively coupled to the system bus 1640 and facilitate interaction with the computer 1602. By way of example, the interface component 1670 can be a port (e.g., serial, parallel, PCMCIA, USB, FireWire, etc.) or an interface card (e.g., sound, video, etc.) or the like. In one example implementation, the interface component 1670 can be embodied as a user input/output interface to enable a user to enter commands and information into the computer 1602, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 1670 can be embodied as an output peripheral interface to supply output to displays (e.g., LCD, LED, plasma, etc.), speakers, printers, and/or other computers, among other things. Still further yet, the interface component 1670 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing device, comprising:
a processors; and
a memory having computer-executable instructions stored thereupon which, when executed by the processor, cause the computing device to:
cause digital ink for an electronic document to be displayed on a particular display device having a particular display characteristic, the digital ink reflecting handwriting by a user onto the electronic document;
analyze the digital ink to determine a semantic structure of the digital ink, the analysis identifying a handwritten paragraph, line, or list as primary digital ink content and identifying a handwritten comment as secondary digital ink content; and
based at least on the particular display characteristic of the particular display device, modify display of at least a portion of the electronic document by minimizing the handwritten comment responsive to the handwritten comment being identified as secondary digital ink content and retaining the handwritten paragraph, line, or list based at least on the handwritten paragraph, line, or list being identified as primary digital ink content.

2. The computing device of claim 1, wherein the computer-executable instructions, when executed by the processor, cause the computing device to:
visually enhance at least the primary digital ink content in response to a trigger.

3. The computing device of claim 2, wherein the trigger is inferred based at least upon a user-configurable setting.

4. The computing device of claim 3, wherein the user-configurable setting relates to a predetermined quantity of digital ink on the electronic document that triggers visual enhancement of the primary digital ink content.

5. The computing device of claim 2, wherein the computer-executable instructions, when executed by the processor, cause the computing device to:
infer the trigger based at least upon a particular user's previous history of visually enhancing handwritten digital ink within other electronic documents.

6. The computing device of claim 1, wherein the semantic structure of the digital ink is based at least upon layout analysis to combine and parse individual input strokes into associated stroke sets.

7. The computing device of claim 6, wherein the semantic structure of the digital ink is further based at least upon classification analysis to determine types of strokes included in the digital ink.

8. The computing device of claim 1, wherein the particular display characteristic comprises a display size of the particular display device, and the handwritten comment is minimized from view while retaining the handwritten paragraph, line, or list based at least on the display size.

9. The computing device of claim 1, wherein the computer-executable instructions, when executed by the processor, cause the computing device to:
parse the digital ink into one or more separate lines; and
visually enhance an individual line of digital ink by:
determining that the individual line is an angle relative to horizontal; and
adjust the individual line to be substantially horizontal while retaining a handwritten appearance.

10. The computing device of claim 1, wherein the computer-executable instructions, when executed by the processor, cause the computing device to:
parse the digital ink into one or more separate lines; and
visually enhance an individual line of digital ink by auto-spacing words on the individual line to have reduced space between individual words while retaining a handwritten appearance.

11. The computing device of claim 1, wherein the computer-executable instructions, when executed by the processor, cause the computing device to:
parse the digital ink into one or more separate lines; and
visually enhance an individual line of digital ink by reducing a size of a specific character on the individual line in conformity with sizes of other characters on the individual line while retaining a handwritten appearance of the specific character and the other characters.

12. The computing device of claim 1, wherein the computer-executable instructions, when executed by the processor, cause the computing device to:
parse the digital ink into one or more separate lines; and
visually enhance an individual line of digital ink by reducing an ink thickness of a specific character on the individual line in conformity with ink thickness of other characters on the individual line while retaining a handwritten appearance of the specific character and the other characters.

13. The computing device of claim 1, wherein the computer-executable instructions, when executed by the processor, cause the computing device to:
parse the digital ink into one or more separate lines; and
visually enhance an individual line of digital ink by reducing an ink thickness of a specific word on the individual line in conformity with ink thickness of other words on the individual line while retaining a handwritten appearance of the specific word and the other words.

14. A method comprising:
causing digital ink for an electronic document to be displayed on a particular display device having a particular display characteristic, the digital ink reflecting handwriting by a user onto the electronic document;

analyzing the digital ink to determine a semantic structure of the digital ink, the analysis identifying a handwritten paragraph, line, or list as primary digital ink content and identifying a handwritten comment as secondary digital ink content; and based at least on the particular display characteristic of the particular display device, modifying display of at least a portion of the electronic document by minimizing the handwritten comment in response to the handwritten comment being identified as secondary digital ink content and retaining the handwritten paragraph, line, or list based at least on the handwritten paragraph, line, or list being identified as primary digital ink content.

15. The method of claim 14, further comprising:
visually enhancing at least the primary digital ink content in response to a command invoked by the user.

16. The method of claim 14, further comprising:
visually enhancing at least the primary digital ink content in response to a trigger that is inferred based at least upon a user-configurable setting.

17. The method of claim 16, wherein the user-configurable setting comprises at least one of an expiration of a predetermined period of time, a predetermined period of user inactivity time, or a predetermined quantity of digital ink on the electronic document.

18. The method of claim 14, wherein the semantic structure of the digital ink is based at least upon layout analysis to combine and parse individual input strokes into associated stroke sets.

19. The method of claim 18, wherein the semantic structure of the digital ink is further based at least upon classification analysis to determine types of strokes included in the digital ink.

20. A computer storage media storing computer-readable instructions that, when executed, cause a computing device to:

cause digital ink for an electronic document to be displayed on a particular display device having a particular display size, the digital ink reflecting handwriting by a user onto the electronic document;

analyze the digital ink to determine a semantic structure of the digital ink, the analysis identifying a handwritten paragraph, line, or list as primary digital ink content and identifying a handwritten annotation comment as secondary digital ink content; and based on the particular display size of the particular display device, modify display of at least a portion of the electronic document by minimizing the handwritten comment responsive to annotation based the handwritten comment being identified as secondary digital ink content and retaining the handwritten paragraph, line, or list based at least on the handwritten paragraph, line, or list being identified as primary digital ink content.

* * * * *